ized Dec. 4, 1951

UNITED STATES PATENT OFFICE 2,577,234

PRODUCTION OF AMINOALKYL ETHERS OF DIARYL CARBINOLS

John W. Cusic, Skokie, Ill., assignor to G. D. Searle & Co., Skokie, Ill., a corporation of Illinois No Drawing. Application July 2, 1947, Serial No. 758,705

8 Claims. (Cl. 260—570)

This invention relates to processes for preparing aminoalkyl ethers of diarylcarbinols. In particular it relates to processes for preparing aminoalkyl ethers of diarylcarbinols by reaction of an aminoalkyl halide with a diarylcarbinol in the presence of alkali, according to the equation

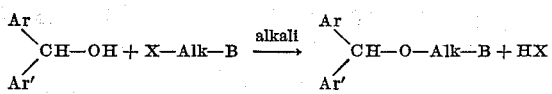

wherein Ar and Ar' are aryl radicals, X is halogen, Alk is an alkylene radical and B is a non-aromatic organic amino group.

This application is a continuation-in-part of my copending application, Serial No. 505,353, filed October 7, 1943, now abandoned.

Aminoalkyl ethers of diarylcarbinols are useful as antispasmodic and antihistaminic agents. Hitherto they have been prepared by such methods as reacting an aminoalkyl halide with the sodium derivative of a diarylcarbinol, prepared by reacting sodium or sodamide in an inert solvent with the diarylcarbinol, or reacting a diarylmethyl halide with an aminoalkanol in the presence of an inorganic base. Both of these general methods have certain attendant disadvantages which are avoided by my processes.

I have discovered that diarylcarbinols, such as benzohydrol, can be condensed with aminoalkyl halides by reaction in the presence of alkali, with or without the addition of an inert solvent. This provides a convenient synthetic approach to ethers of the desired type, since both the diarylcarbinols and aminoalkyl halides are readily available. The yields by my methods are at least as great as and generally greater than yields by other procedures, being of the order of 60-80% of theoretical.

I have found that the relative amounts of reagents necessary for efficient operation of my processes can be practically theoretical amounts; in other words, excesses of one or more reagents are unnecessary and as a consequence my procedure is economical as regards materials. For each mole of the diarylcarbinol I prefer to use about 1.2 moles of the aminoalkyl halide and an equivalent amount of alkali. However, my process works effectively when there is 1.05 moles of the aminoalkyl halide for each mole of the diarylcarbinol. Obviously increased quantities of the aminoalkyl halide and alkali may be used for a given quantity of diarylcarbinol, but this is unnecessary and often undesirable. The reaction can be carried out in about 2 hours, although I prefer to extend the time to approximately 5-8 hours, and longer periods are of course suitable. The temperature range which I have found most satisfactory is in the range of 85-100° centigrade, although the reaction proceeds suitably at temperatures as low as 65-70° C. and at temperatures as high as 110-120° C. It is clear that at higher temperatures shorter times are required. It is generally possible to select a temperature and time interval such that the reaction proceeds efficiently and gives a high yield of a pure product uncontaminated with starting material or side products. I prefer to carry out my reaction by mixing the three reactants in suitable proportions while applying gentle heat. However it is sometimes desirable to use an inert solvent for carrying out the reaction, in order to make the reaction mixture more easily agitated and more nearly homogeneous. For this purpose I have found that solvents such as benzene, toluene and other hydrocarbons boiling in the range of temperature at which the reaction is to be carried out are suitable. Similarly ethers and other inert substances which are stable to alkali can be used.

In the diaryl carbinols having the formula

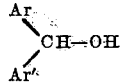

Ar and Ar' represent aryl radicals of the benzene series such as phenyl and substituted-phenyl radicals wherein the substituents are stable to alkali and include groups such as alkyl, alkoxy, halo, nitro, amino and the like. Ar and Ar' may represent the same or different aryl radicals.

In the aminoalkyl halide having the formula

X represents a halogen atom such as chlorine, bromine or iodine. For practical considerations I prefer to use the chlorides, since they are more easily prepared and cheaper, but the bromides and iodides are equally satisfactory. It is often more convenient to use the aminoalkyl halide hydrohalide, since such salts are stable crystalline derivatives. When these salts are used, a greater quantity of alkali is of course required to neutralize the hydrohalic acid. The amino grouping B represents an aliphatic or an aliphatic-type secondary- or tertiary-amino group such as a mono- or dialkylamino group or an amino group derived from an aliphatic-type amine such as piperidine, pyrrolidine, morpholine, thiamorpholine and alkylated derivatives of such heterocyclic amines. My process is suitable for aminoalkyl halides wherein the amino group is derived from a strong primary or secondary organic base, such as those having ionization constants in the range of $10^{-3}$ to $10^{-6}$. Such amines are aliphatic or aliphatic-like in their properties. The alkylene radical represented by Alk is a bivalent radical derived from a saturated aliphatic hydrocarbon and is exemplified by ethylene, propylene, butylene, trimethylene, tetramethylene, and amylene groups. It may be straight or branched and it may bear certain substituents such as aromatic radicals. It may be part of a carbocyclic system or a heterocyclic system which contains the amino radical, B.

The condensing agent for my process is one of the alkalies. Of these, the sodium, potassium and lithium hydroxides are the more generally available and for this reason are the preferred agents. In practice sodium hydroxide is the condensation agent of choice, due primarily to its low cost. While hydroxides of the alkali metals are the more common of the alkalies, the alcoholates of these metals are also within the purview of my processes and are satisfactory agents for the reaction. Among such alcoholates are the alkoxides of alkali metals, such as sodium methoxide, sodium ethoxide, potassium ethoxide, potassium tertiary-butoxide, potassium tertiary-amyloxide, sodium isopropoxide, sodium butoxide, lithium methoxide and ethoxide, and lithium isobutoxide.

My invention is further disclosed by the following examples, which illustrate methods of executing my process. It is obvious that those skilled in the art may introduce modifications in temperature, time, solvent, relative quantities of reagents and the like, without departing from the spirit or scope of my invention. In these examples the parts are parts by weight.

*Example 1*

36.8 grams of benzohydrol, 34.6 g. of beta-diethylaminoethyl chloride hydrochloride and 32 g. of powdered sodium hydroxide are well mixed and heated upon a steam bath for 8–10 hours. The melted product is then poured into water, acidified, and the acid solution extracted with ether to remove unreacted materials. The aqueous acid solution is then made strongly alkaline with sodium hydroxide, and the desired aminoalkyl ether extracted with ether and dried. The amino-ether thus obtained is an oil which boils at 174–176° C. at 7 millimeters pressure.

*Example 2*

92 parts of benzohydrol, 100 parts of powdered sodium hydroxide and 145 parts of beta-dimethylaminoethyl chloride hydrochloride are thoroughly mixed and heated at 95–100° C. for 8–10 hours. The reaction mass is dissolved in dilute hydrochloric acid and extracted with ether to remove non-basic material. The acid solution is made alkaline and extracted with ether. The ether extract is washed and dried with anhydrous sodium sulfate. After evaporation the residue of benzohydryl beta-dimethylaminoethyl ether is distilled at 165–170° C. at 7 mm. pressure. Yield, 100 parts. Its hydrochloride melts at 167–168° C.

*Example 3*

An intimate mixture of 184 parts of benzohydrol, 120 parts of powdered sodium hydroxide and 191 parts of beta-di-n-butylaminoethyl chloride are heated together at 90–100° C. for 8 hours. Benzohydryl beta-di-n-butylaminoethyl ether is isolated as in Example 2 and distils at 188–190° C. at 6 mm.

*Example 4*

184 parts of benzohydrol, 149 parts of gamma-diethylaminopropyl chloride and 80 parts of powdered sodium hydroxide are thoroughly mixed and heated at 90–100° C. for 10 hours with occasional agitation. The base is isolated as in Example 2. Benzohydryl gamma-diethylaminopropyl ether so prepared distils at 172–174° C. at 6 mm. Yield, 190 parts.

*Example 5*

1 mole of benzohydrol, 1.2 moles of beta-methylaminoethyl bromide hydrobromide and 2.4 moles of powdered potassium hydroxide are intimately mixed and heated at 90–100° C. for 6 hours. The cooled mass is taken up in an excess of dilute mineral acid and washed with benzene. The acid solution is made alkaline and the base removed with ether. The ether solution is washed with water, dried with pellets of caustic soda and filtered. The filtrate is treated with a slight excess of anhydrous alcoholic hydrogen chloride and the precipitate of beta-methylaminoethyl benzohydryl ether hydrochloride so obtained is removed and recrystallized from isopropanol. It melts at 159–160° C.

*Example 6*

A suspension of 67 parts of beta-piperidinoethyl chloride hydrochloride, 40 parts of powdered sodium hydroxide, and 55 parts of benzohydrol in 500 cc. of toluene is refluxed and stirred for 5 hours. The mixture is filtered and evaporated under reduced pressure. There is obtained by this procedure beta-piperidinoethyl benzohydryl ether as an oily residue. This is taken up in ether and reacted with alcoholic hydrogen chloride. The hydrochloride so prepared melts at 168–169° C. when recrystallized from isopropanol.

*Example 7*

199 parts of p-aminobenzohydrol, 270 parts of beta-diethylaminoethyl chloride and 224 parts of powdered potassium hydroxide are thoroughly mixed and heated together at about 100° C. for 8–10 hours. The mass is leached with ether. The ether solution is washed with water, dried and evaporated. The residue of beta-diethylaminoethyl p-aminobenzohydryl ether is distilled at 245–250° C. at 5 mm. pressure.

*Example 8* o,p'-Dimethylbenzohydrol (melting point 103–105° C.) is prepared by the reaction of o-tolylmagnesium bromide (made from 130 parts of magnesium and 855 parts of o-bromotoluene in dry ether) with 60 parts of p-tolualdehyde in 3500 parts of dry ether. Then 212 parts of o,p'-dimethylbenzohydrol, 270 parts of beta-diethylaminoethyl chloride and 200 parts of powdered caustic soda are intimately mixed and heated to 90–100° C. for 8 hours. The charge is leached with ether and the ether solution is washed, dried and evaporated. beta-Diethylaminoethyl o,p'-dimethylbenzohydryl ether so obtained distils at 180–184° C. at 5 mm. pressure. Its hydrochloride melts at 172–174° C.

*Example 9*

To a solution of 276 parts of benzohydrol in 1500 parts of toluene at 20° C. are added 216 parts of beta-dimethylaminoethyl chloride hydrochloride. The mixture is agitated and 180 parts of flake caustic soda is added in 10 minutes. The charge is agitated and heated to 72° C. for ½ hour, and then at 90–110° C. for 1½ hours. The toluene suspension is filtered to remove salt and the filtrate is extracted with dilute mineral acid. The acid extract is made slightly alkaline with caustic soda solution and the oily layer of beta-dimethylaminoethyl benzohydryl ether is taken up in toluene. The toluene layer is separated, dried and evaporated. The residue distils at 156–163° C. at 1.0–1.9 mm.

*Example 10*

1 mole of benzohydrol is melted and mixed with 2.1 moles of flake sodium hydroxide. To the warm mixture are added in 1 hour 1.05 moles of beta-dimethylaminoethyl chloride hydrochloride. The charge is kept at 70–75° C. throughout the addition and for 4 hours longer. A volume of water approximately equal to that of the charge is added, the mixture is agitated and cooled, and the aqueous layer removed. The residue so obtained is beta-dimethylaminoethyl benzohydryl ether of sufficient purity for conversion to water-soluble salts.

I claim:
1. The process of preparing an aminoalkyl ether of a diarylcarbinol which comprises heating an aminoalkyl halide of the formula

wherein X is halogen, Alk is a lower alkylene radical and B is an amino radical selected from di(lower alkyl)amino, mono(lower alkyl)amino and 1-piperidino radicals, with a diarylcarbinol of the formula

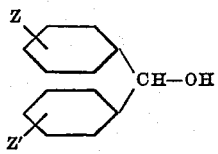

wherein Z and Z' are members of the group consisting of hydrogen, NH₂ and lower alkyl radicals, in the presence of caustic alkali.

2. The process of preparing an aminoalkyl ether of a diarylcarbinol which comprises heating a dialkylaminoalkyl halide of the formula

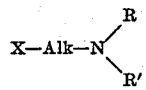

wherein X is halogen, Alk is a lower alkylene radical and R and R' are lower alkyl radicals, with a diarylcarbinol of the formula

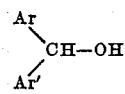

wherein Ar and Ar' are monocyclic aromatic hydrocarbon radicals, in the presence of caustic alkali.

3. The process of producing β-dimethylaminoethyl benzohydryl ether which comprises heating at a temperature in the range of about 65° C. to about 120° C. a mixture comprising about 1 to 1.2 molecular equivalents of β-dimethylaminoethyl chloride and about 1 to 1.2 molecular equivalents of sodium hydroxide for each equivalent of benzohydrol, and isolating the β-dimethylaminoethyl benzohydryl ether thus formed.

4. The process of producing β-dimethylaminoethyl benzohydryl ether which comprises heating at approximately 100° C. a mixture of equivalent amounts of β-dimethylaminoethyl chloride and benzohydrol with approximately 1.05 equivalents of sodium hydroxide, and isolating the β-dimethylaminoethyl benzohydryl ether thus formed.

5. The process of preparing a dialkylaminoalkyl ether of benzohydrol which comprises heating at a temperature in the range of about 65° C. to about 120° C. a mixture comprising 1 to 1.2 molecular equivalents of a di(lower alkyl)amino-lower-alkyl halide, 1 to 1.2 molecular equivalents of benzohydrol and 1 to 1.2 molecular equivalents of caustic alkali, and isolating the dialkylaminoalkyl benzohydryl ether thus formed.

6. The process of preparing a dialkylaminoalkyl ether of benzohydrol which comprises heating a di(lower alkyl)amino-lower-alkyl halide with benzohydrol in the presence of caustic alkali.

7. The process of preparing a beta-dimethylaminoethyl ether of benzohydrol which comprises heating a beta-dimethylaminoethyl halide with benzohydrol in the presence of caustic alkali.

8. The process of preparing the beta-dimethylaminoethyl ether of benzohydrol which comprises heating beta-dimethylaminoethyl chloride with benzohydrol in the presence of sodium hydroxide.

JOHN W. CUSIC.

REFERENCES CITED

The following references are of record in the file of this patent:

UNITED STATES PATENTS

| Number | Name | Date |
|---|---|---|
| 2,153,513 | Coleman et al. | Apr. 4, 1939 |
| 2,312,135 | Ulrich et al. | Feb. 23, 1943 |
| 2,397,799 | Martin et al. | Apr. 2, 1946 |
| 2,421,714 | Rieveschl | June 3, 1947 |
| 2,438,090 | Clifford et al. | Mar. 16, 1948 |

OTHER REFERENCES

Richter: "Textbook of Organic Chem.," J. Wiley and Sons, New York, 1938, pp. 83–84.

Holleman: "Textbook of Organic Chem.," J. Wiley and Sons, New York, 1907, pp. 371–372.

Fieser et al.: "Organic Chemistry," Heath and Co., Boston, Mass., 1944, pp. 127–128.